US012074368B2

(12) United States Patent
Larsen et al.

(10) Patent No.: US 12,074,368 B2
(45) Date of Patent: Aug. 27, 2024

(54) ELECTRONIC COMPUTING DEVICE HAVING SELF-SHIELDING ANTENNA

(71) Applicant: INTEL CORPORATION, Santa Clara, CA (US)

(72) Inventors: Denica Larsen, Portland, OR (US); Dong-Ho Han, Beaverton, OR (US); Kwan Ho Lee, Santa Clara, CA (US); Shantanu Kulkarni, Hillsboro, OR (US); Jaejin Lee, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 17/754,149

(22) PCT Filed: Dec. 27, 2019

(86) PCT No.: PCT/US2019/068649
§ 371 (c)(1),
(2) Date: Mar. 25, 2022

(87) PCT Pub. No.: WO2021/133404
PCT Pub. Date: Jul. 1, 2021

(65) Prior Publication Data
US 2022/0294109 A1 Sep. 15, 2022

(51) Int. Cl.
*H01Q 1/52* (2006.01)
*H01Q 1/24* (2006.01)
(Continued)

(52) U.S. Cl.
CPC ............. *H01Q 1/526* (2013.01); *H01Q 1/243* (2013.01); *H01Q 9/285* (2013.01); *H01Q 9/42* (2013.01)

(58) Field of Classification Search
CPC .......... H01Q 1/243; H01Q 15/14; H01Q 1/38; H01Q 1/42; H01Q 1/526
See application file for complete search history.

(56) References Cited

U.S. PATENT DOCUMENTS

2013/0335941 A1* 12/2013 Minaguchi ........... H01Q 1/2266 361/818
2014/0133823 A1* 5/2014 Simmons ............. H02G 3/0675 385/137
(Continued)

FOREIGN PATENT DOCUMENTS

JP 2003017154 A 1/2003
JP 2004072320 A 3/2004
JP 2007142960 A 6/2007

*Primary Examiner* — Dimary S Lopez Cruz
*Assistant Examiner* — Aladdin Abdulbaki
(74) *Attorney, Agent, or Firm* — 2SPL Patent Attorneys PartG mbB; Yong Beom Hwang

(57) ABSTRACT

An electronic computing device with a self-shielding antenna. An electronic computing device may include a frame, an antenna, and an antenna shielding. The frame includes a top cover and a bottom cover. Electronic components are included in a space formed between the top cover and the bottom cover. The antenna is for wireless transmission and reception and included in the frame near an edge of the frame. The antenna shielding is disposed around the antenna for providing electro-magnetic shielding from radio frequency (RE) noises generated from the electronic components included in the frame. The antenna shielding may be a metal wall disposed between the top cover and the bottom cover around the antenna. The frame may be a metallic frame and may include a cut-out in the top cover and the bottom cover above and below the antenna, and a non-metallic cover may be provided in the cut-out.

16 Claims, 19 Drawing Sheets

(51) Int. Cl.
*H01Q 9/28* (2006.01)
*H01Q 9/42* (2006.01)

(56) References Cited

U.S. PATENT DOCUMENTS

| | | | | |
|---|---|---|---|---|
| 2015/0084816 | A1* | 3/2015 | Kurose | H01Q 1/526<br>343/702 |
| 2015/0280313 | A1* | 10/2015 | Sanford | H01Q 1/38<br>343/702 |
| 2018/0070484 | A1 | 3/2018 | Mundell et al. | |
| 2018/0316082 | A1* | 11/2018 | Keller, III | H01Q 1/247 |
| 2019/0348749 | A1* | 11/2019 | Thai | H01L 23/66 |

* cited by examiner

Gain plot (2.4GHz)

Component only

Integrated antenna

Gain plot (5.0GHz)

Component only

Integrated antenna

ELECTRONIC COMPUTING DEVICE HAVING SELF-SHIELDING ANTENNA

FIELD

Examples relate to an electronic computing device, more particularly an electronic computing device with a self-shielding antenna.

BACKGROUND

Wi-Fi radio is one of the key components in electronic computing devices, such as notebook computers, tablet computers, mobile phones, or the like. The Wi-Fi radio requires reliable connections and high throughput performance. However, many high-speed digital input/output (I/O) devices, Universal Serial Bus (USB), Solid State Drive (SSD), display, camera, Double Data Rate (DDR) memory devices, and switching power supply modules on a motherboard in the electronic computing devices generate radiating radio frequency (RF) noises. These platform-generated RF noises are broadband in nature and can be easily picked up by the antennas in the electronic computing devices. This can result in an unacceptable Wi-Fi user experience, such as connection failures, slow download speed, reduced access range, or the like.

FIG. 1 illustrates an example notebook computer where Wi-Fi antennas (victims) are being exposed to platform-generated RF noises from the devices or circuitries (aggressors) on the platform of the electronic computing device. In a typical notebook computer, antennas are placed on the outer perimeters of the notebook chassis. The components located on the notebook platform (e.g. a motherboard) such as USB, DDR, SSD, display, camera components or the like may generate RF radiation. This RF radiation may propagate toward the antenna(s), as indicated by the arrows in FIG. 1, and may be picked up by the antenna(s). The antenna(s) may simultaneously receive desired wireless signals from radio transmitters and the undesired platform-generated RF radiation noises from the platform aggressors (e.g. USB, SSD, display, camera, DDR devices, or the like). This RF noise and interference may degrade the performance of the notebook computer.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
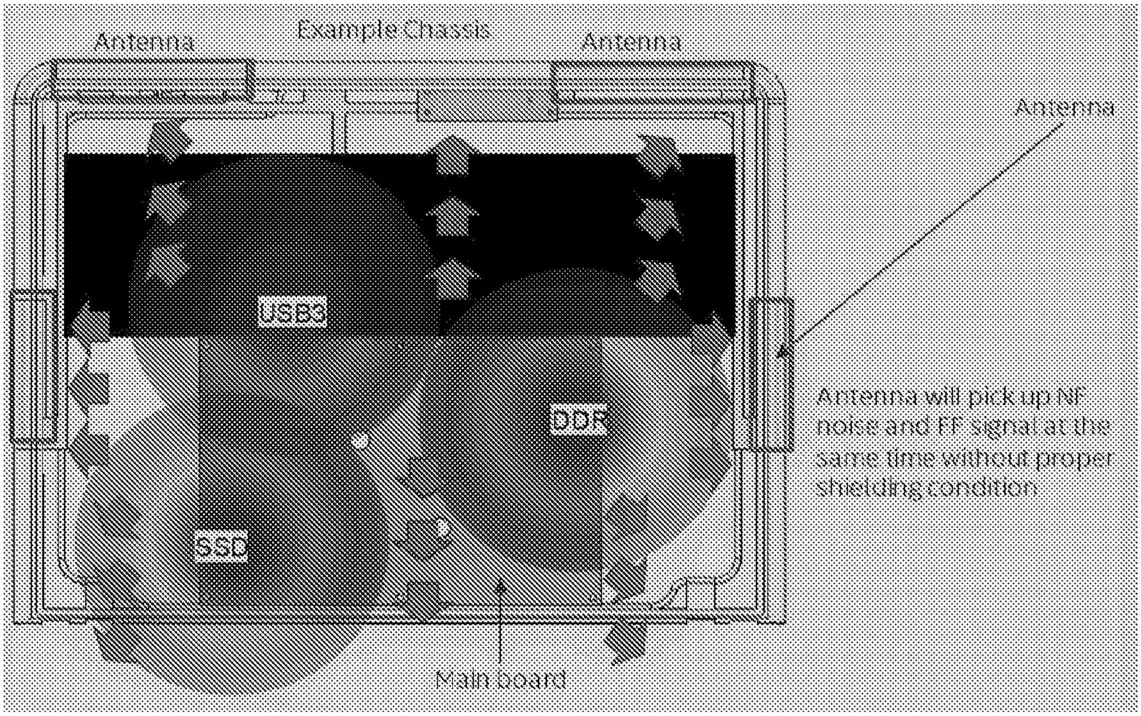
FIG. 1 illustrates an example notebook computer.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being “connected” or “coupled” to another element, the elements may be directly connected or coupled or via one or more intervening elements. If two elements A and B are combined using an “or”, this is to be understood to disclose all possible combinations, i.e. only A, only B as well as A and B. An alternative wording for the same combinations is “at least one of A and B”. The same applies for combinations of more than 2 elements.

The terminology used herein for the purpose of describing particular examples is not intended to be limiting for further examples. Whenever a singular form such as “a,” “an” and “the” is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms “comprises,” “comprising,” “includes” and/or “including,” when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In order to reduce or eliminate the interferences caused by the platform-generated RF noises, the RF noise sources on a motherboard in electronic computing devices may be identified and an electro-magnetic interference (EMI) shield may be applied to enclose the RF noise sources (aggressors). The RF noise sources can be located anywhere on the motherboard. Therefore, an on-board EMI shield covering a substantial or entire motherboard area is needed to isolate the antenna(s) from the platform RF noise sources.

Figure 2A:
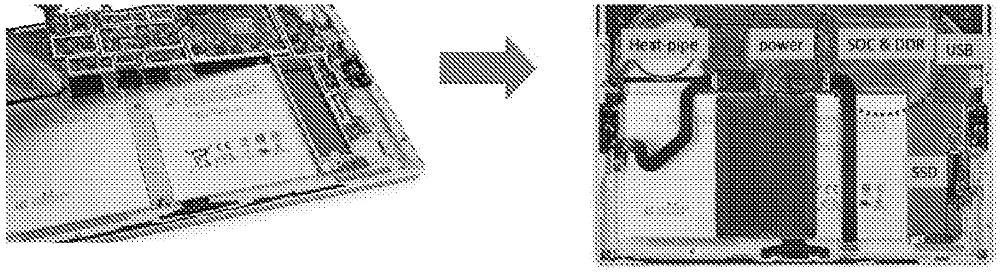
FIG. 2A shows applying an electro-magnetic interference (EMI) shield on the RF noise sources on a circuit board.

The on-board EMI shields (e.g. a metal enclosure) may enclose all radiating RF noise sources in a motherboard. FIG. 2A shows applying an EMI shield on the RF noise sources on a circuit board. The left-side drawing of FIG. 2A shows before placement of an EMI shield and the right-side drawing of FIG. 2A shows after the on-board EMI shield is applied.

Figure 2B:
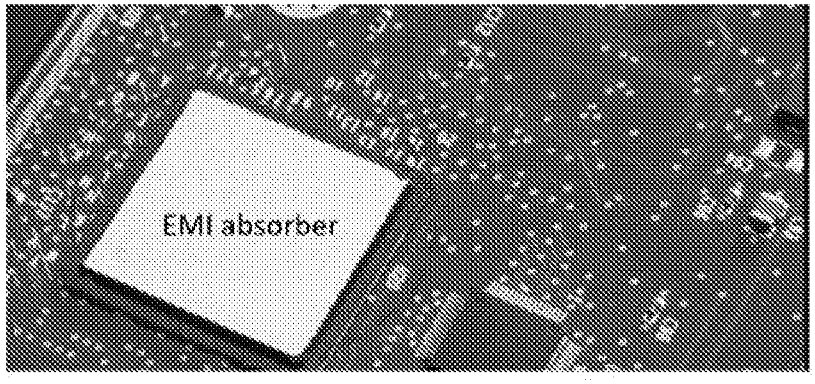
FIG. 2B shows applying an EMI absorber on top of an aggressor integrated circuit (IC) chip.

Another method is applying an EMI absorber(s) onto the radiating RF noise sources such as an integrated circuit (IC) chip. FIG. 2B shows applying an EMI absorber (shown in a dotted circle) on top of an aggressor IC chip. The EMI absorber may attenuate the RF noise radiations from the aggressor. EMI absorber may absorb electromagnetic RF interference in a broadband range and improve antenna performance.

The conventional EMI shields and absorbers have some disadvantages. The on-board EMI shields may increase the motherboard size (in X and Y directions) and the system height (in Z direction). In conventional notebook computers or other similar electronic computing devices, the increased dimensions would limit the size of other components such as a battery and development of slim product designs. The EMI shields can also increase the bill-of-material (BOM) cost. The EMI shield itself (mechanical fences, lids, and contact gaskets) increases the cost, and it also requires more expensive micro-via printed circuit board (PCB) process rather than typical plated through hole (PTH) via process for high density ball grid array (BGA) breakouts because of EMI shield fine ground stitching. The EMI shields may block air flows of active cooling systems and limit system thermal design power (TDP) or performance. The EMI shields and absorbers may introduce additional complexities in assembly and disassembly and rework/repair in factories.

Hereinafter, examples for an electronic computing device with a self-shielding antenna will be explained with reference to a notebook computer (i.e. laptop computer). The drawing figures show only a case of notebook computer. However, it should be noted that the reference to the notebook computer is merely an example and the examples disclosed herein are applicable to any electronic computing devices with an antenna(s).

Contrast to the on-board EMI shields applied to cover all RF noise sources on a circuit board, in accordance with the examples disclosed herein, an antenna self-shielding is implemented. For implementing the antenna self-shielding, a specific WiFi antenna type may be selected for physical and electrical isolations from the chassis, and a new scheme is used to integrate the antenna onto either metallic or non-metallic (e.g. plastic) chassis, which will be explained in detail below. In accordance with the examples disclosed herein, the antenna is isolated from the platform RF noise sources without sacrificing the antenna performances by creating a small EMI shield for the antenna rather than widespread RF noise sources.

In accordance with an example, an electronic computing device may include a frame 110, an antenna 120, and an antenna shielding 130. The electronic computing device may be a notebook computer, a tablet computer, a mobile phone, a smart phone, a desk-top computer, or any other types of electronic computing device. The frame 110 includes a top cover 112 and a bottom cover 114. The frame 110 is a housing for accommodating various electronic components and circuitries needed for the electronic computing device, such as a circuit board(s), USB devices, DDR and SSD devices, display, camera, speaker, microphone, I/O devices, or the like. The electronic components are included in a space formed between the top cover 112 and the bottom cover 114. The antenna is provided for wireless transmissions and receptions. The antenna 120 may be included near an edge of the frame 110. The antenna shielding 130 is provided around the antenna 120 for providing electro-magnetic shielding from the RF radiations (i.e. RF noises) from the electronic components included in the frame 110.

The antenna shielding 130 may be a metal wall disposed between the top cover 112 and the bottom cover 114 around the antenna. The metal wall encloses the antenna 120 from the inside of the frame, i.e. the antenna 120 located along the edge of the frame 110 is blocked from the RF noise sources inside the frame 110 by the metal wall. The metal wall may include an antenna cable feed-through hole 132 for connecting the antenna 120 to the circuitry (e.g. a transceiver) inside the frame 110. An antenna cable 134 may be connected to the antenna 120 via a conductive grommet 140 that is inserted into the antenna cable feed-through hole 132. The conductive grommet 140, such as a conductive rubber grommet may seal the antenna cable feed-through hole 132 so that no RF noise may leak through the antenna cable feed-through hole 132. Alternatively, the antenna 120 may be connected to a circuitry inside the frame 110 via a pogo pin 150.

The frame 110 may include a non-metallic area 170 on the top cover 112 and/or the bottom cover 114 above and below the antenna 120, respectively. The non-metallic area 170 is provided for RF radiations to and from the antenna 120.

The frame may be a metallic frame, such as a metallic single body frame. For the non-metallic area 170, the frame 110 may include a cut-out 174 in the top cover 112 and the bottom cover 114 above and below the antenna 120, and a non-metallic cover 172 may be provided in the cut-out 174. In case of a metallic body, the antenna shielding 130 and the frame 110 may be formed integrally, i.e. as a single body.

The frame 110 may be a non-metallic frame with a metallic coating. The frame 110 may further include an augmented antenna shielding 180 in addition to the antenna shielding 130. The augmented antenna shielding 180 may include a metallic layer 182 on the top cover 112 and the bottom cover 114, respectively, outside the antenna shielding 130 and a vertical shielding fence 184 formed along an outer edge of the metallic layer 182. The vertical shielding fence 184 may include a plurality metallic pins or contacts formed between a metallic layer on the top cover 112 and a metallic layer on the bottom cover 114.

The antenna 120 may be an antenna that does not require an RF ground, e.g. a dipole antenna. The antenna may be configured to operate on a 2.4 GHz band or a 5 GHz band. The electronic device may be one of a notebook computer, a table computer, a mobile phone, a smart phone, or a desk-top computer. The antenna may be a replaceable antenna module.

With the self-shielding antenna in accordance with the examples disclosed herein, it is possible to eliminate the on-board EMI shields or absorbers, such as the ones shown in FIGS. 2A and 2B. The examples provide many direct and indirect advantages over the conventional RF noise shielding schemes. With the self-shielding antenna structure in accordance with the examples disclosed herein, the BOM cost (e.g. for EMI shields and gaskets) may be reduced. The PCB manufacturing cost may also be reduced since no micro-via would be required even for high density BGA. Increased TDP headroom and simplified thermal designs are possible with removed EMI design constraints. The PCB area and the system height may also be reduced by eliminating the EMI shields and their PCB footprints. As a result of the reduced PCB sizes and system height, a larger battery can be used for the system to increase the battery life.

Figure 3:
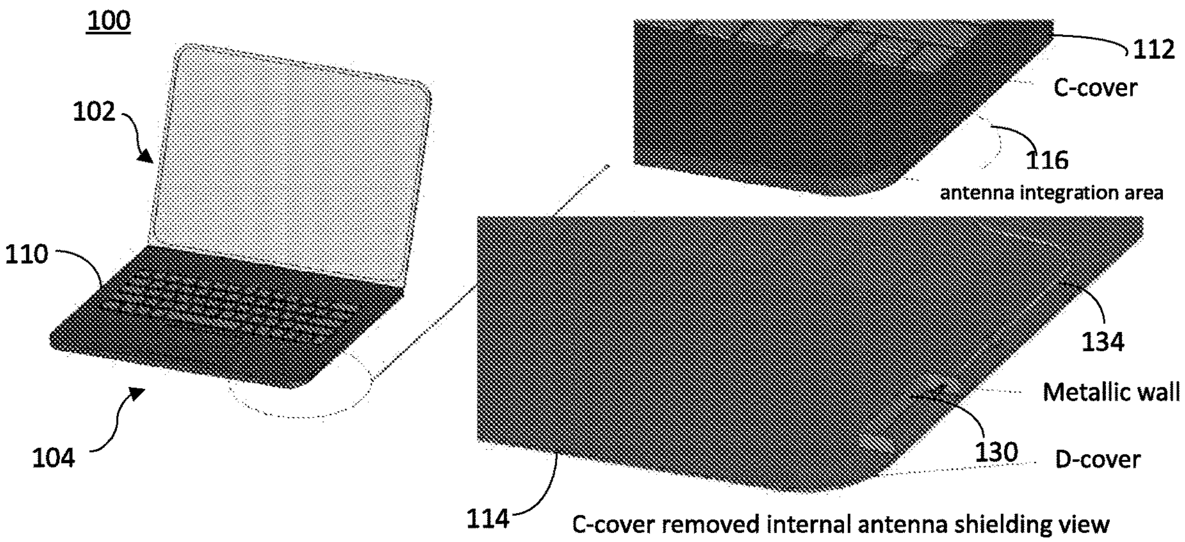
FIG. 3 shows an example notebook computer and an antenna shielding integrated into a frame of the notebook computer in accordance with one example.

FIG. 3 shows an example notebook computer 100 and an antenna shielding 130 integrated into a frame 110 of a notebook computer 100 in accordance with one example. The notebook computer 100 may have a clamshell type form factor having a lid 102 and a base 104 that are coupled with a hinge.

The lid 102 of the notebook computer 100 may include a display screen. The base 104 includes a frame 110, which may be referred to as a chassis or a case. Numerous electronic components needed for the notebook computer 100 may be included in the frame 110. The frame 110 may be in a thin, flat, and generally rectangular shape and provides structural support for the electronic components. The frame 110 houses a circuit board(s), I/O devices, memories, a storage device(s), a camera, an antenna(s), and/or other devices.

The antenna(s) 120 (not shown in FIG. 3 for simplicity but shown in FIGS. 7A, 7B, 8A, 10, and 12A) is provided in the frame 110 for wireless transmission and reception. The antenna 120 may be adapted for wireless transmissions and receptions according to IEEE 802.11 WiFi standards. Alternatively, the antenna 120 may be compatible with any wireless communication standards, such as Second Generation (2G), Third Generation (3G), Fourth Generation (4G), or Fifth Generation (5G) cellular wireless communication standards, Bluetooth, WiMax, etc. Multiple antennas may be included in the notebook computer for supporting different wireless communication standards or different frequency bands.

The frame 110 may comprise a top cover 112 that may be referred to as a "C" cover and a bottom cover 114 that maybe referred to as a "D" cover. A cavity may be formed between the top cover 112 and the bottom cover 114, and the electronic components of the notebook computer 100 may be included in the cavity. The top cover 112 and the bottom cover 114 may form an integrated single piece of a frame (i.e. a single body frame). Alternatively, the top cover 112 and the bottom cover 114 may be separate pieces and may be assembled into a frame 110. The frame 110 may be a metallic frame (e.g. an aluminum frame) or a non-metallic frame (e.g. a plastic frame) with a metallic coating.

As shown in FIG. 3, the frame 110 may include an antenna integration area 116 in which an antenna 120 is placed. The antenna integration area 116 may be formed near and along the edge of the frame 110. Two or more antenna integration areas 116 may be formed in the frame 110 to include two or more antennas 120.

In one example, an antenna shielding 130 may be provided around the antenna 120 in order to electrically isolate the antenna 120 from the platform-generated RF noises. The antenna shielding 130 may be a metallic wall surrounding the antenna 120 between the top cover 112 and the bottom cover 114. The metallic wall may block the inner sides of the frame 110 around the antenna 120 while the outer edge side of the frame 110 around the antenna 120 and the top and bottom surfaces of the frame 110 above and below the antenna may be open for RF radiation to and from the antenna 120. The metallic wall covering the antenna may be a C or U shape as shown in FIG. 3. This antenna self-shielding is built into the frame 110 (i.e. the system chassis) and is not affected by the motherboard design. The size of the metallic wall may be defined by the integrated antenna 120 size plus a keep out zone (KOZ). To avoid the antenna 120 intrinsic performance, a KOZ distance may be considered to separate the edge of antenna 120 radiating conductor element to metallic wall or antenna shielding 130 edge. This separated distance of KOZ should be at least 5 mm so that the total C or U shape cutout dimension in xyz may be defined as antenna size x and y plus 5 mm KOZ. The z dimension does not require KOZ since it is electrically open to antenna 120 top and bottom.

The antenna shielding 130 (e.g. the metallic wall) may include an antenna cable feed-through hole 132 for connecting the antenna 120 to a circuitry (e.g. a transceiver) inside the frame 110. For example, the antenna 120 may be connected to a circuitry inside the frame 110 using an antenna cable 134 via the antenna cable feed-through hole 132. There is a potential for RF noise leakage through the antenna cable feed-through hole 132. Therefore, the antenna cable feed-through hole 132 should be sealed properly.

Figure 4:
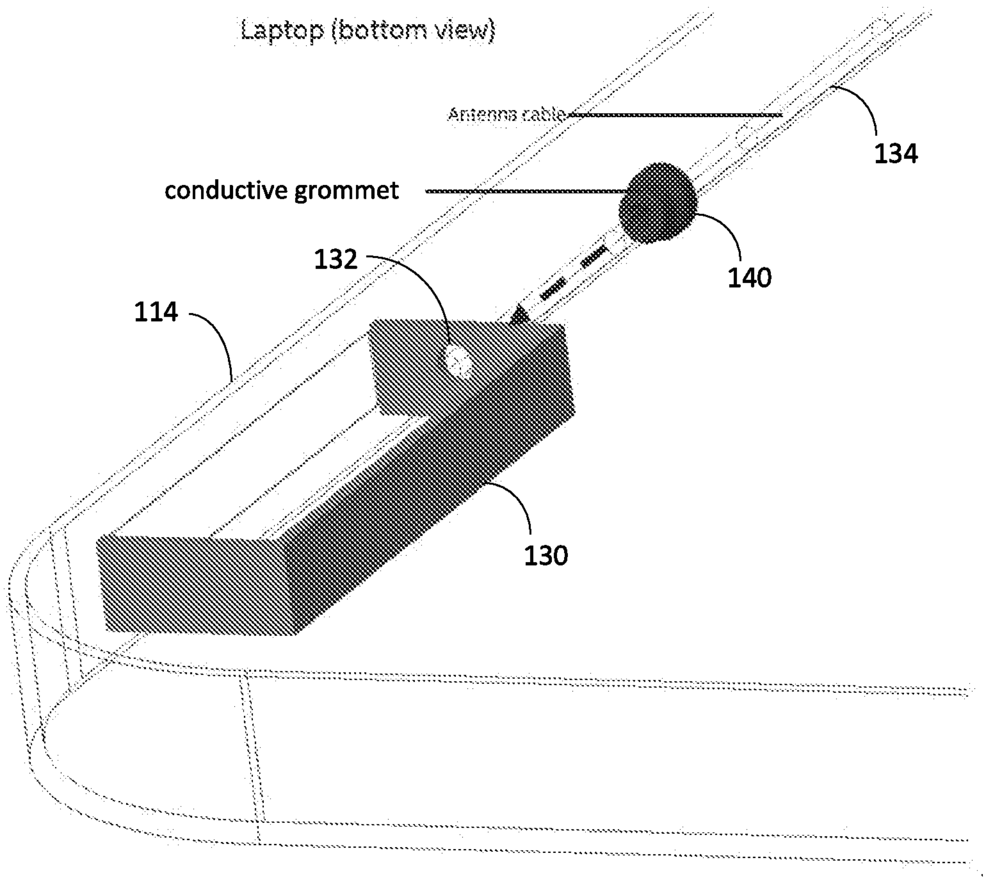
FIG. 4 shows an example for sealing the antenna cable feed-through hole using a conductive grommet.

In one example, a conductive grommet 140 may be used for sealing the antenna cable feed-through hole 132. FIG. 4 shows an example for sealing the antenna cable feed-through hole 132 using a conductive grommet 140 (e.g. a conductive rubber grommet). A grommet is a ring-shaped component having a hole in the middle. The conductive grommet 140 is inserted into the antenna cable feed-through hole 132 and the antenna cable 134 may be inserted through the conductive grommet 140 to connect to the antenna 120 inside the antenna shielding 130.

Figure 5:
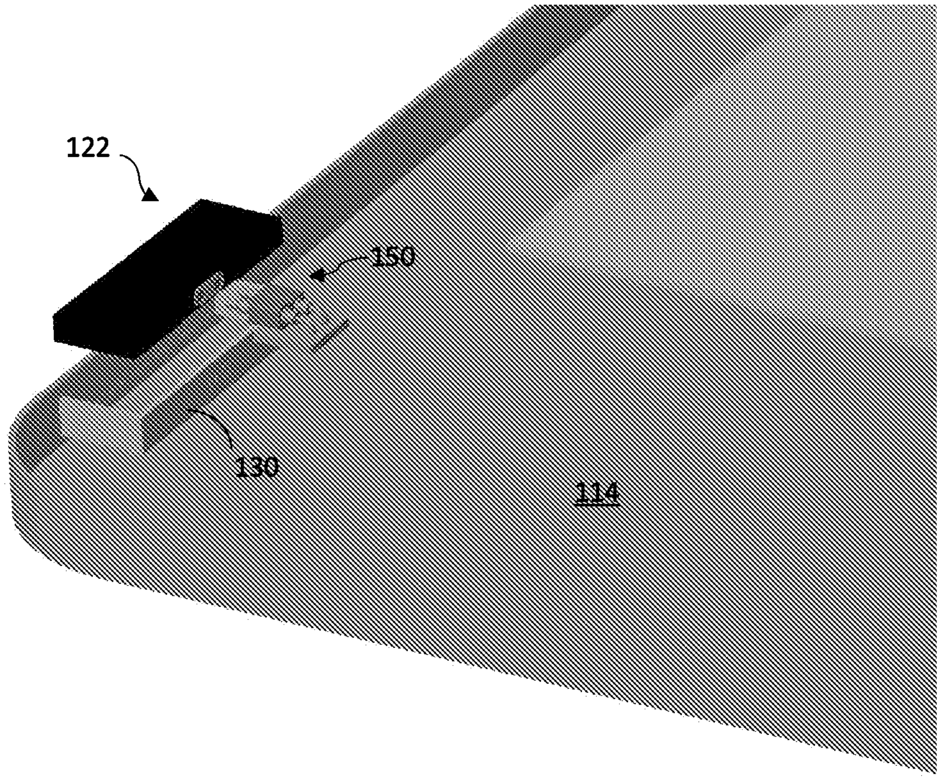
FIG. 5 shows connecting the antenna using a pogo-pin.

In another example, a pogo pin 150 may be used for sealing the antenna cable feed-through hole 132. FIG. 5 shows an example pogo-pin 150 for connecting the antenna 120 to the circuitry inside the frame 110. A pogo pin 150 (a spring-loaded pin) is a type of electrical connector having a plunger, a barrel, and a spring. The pogo pin 150 may be inserted into the antenna cable feed-through hole 132 to connect the antenna 120 or antenna module inside the antenna shielding 130 to a circuitry (e.g. a transceiver) inside the frame 110. The antenna 120 may be modularized such that the antenna module 122 may be upgraded or replaced easily if needed.

Figure 6:
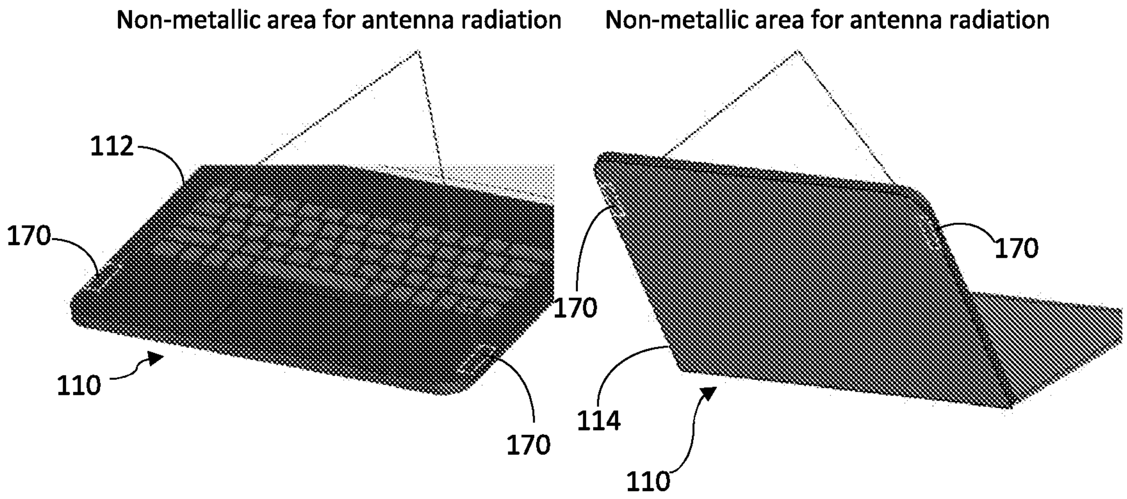
FIG. 6 shows a non-metallic zone provided above and below the antenna in the top cover and the bottom cover.

FIG. 6 shows a non-metallic zone 170 provided above and below the antenna 120 in the top cover 112 and the bottom cover 114, respectively. The non-metallic zone 170 is provided for the RF radiations to and from the antenna 120. The non-metallic zone 170 may be formed in the top cover 112 and/or in the bottom cover 114 right above and/or below the antenna shielding 130 for antenna radiation. The area of the non-metallic zone 170 may be same as the area defined by the antenna shielding 130.

Figure 7A:
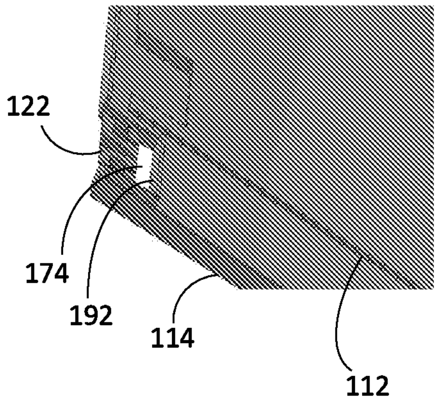
FIGS. 7A and 7B show a cut-out section formed in the frame to form a non-metallic zone.
Figure 7B:
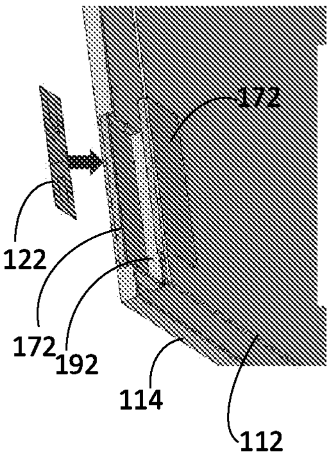

In one example, the antenna integration area of the frame 110 (i.e. in the top cover 112 and the bottom cover 114) may be cut out as shown in FIG. 7A to form the non-metallic zone 170, and a non-metallic cover 172 (e.g. a plastic cover) may be installed in the cut-out section 174 of the top cover 112 and the bottom cover 114 as shown in FIG. 7B. An antenna module 122 may then be installed in the cut-out section 174 as shown in FIG. 7B.

In case where the frame 110 is a metallic body (e.g. a single metallic body), the antenna shielding 130 (i.e. the metallic wall) may be integrated with the metallic body frame 110 instead of installing the antenna shielding 130 separately. The C-shape metallic side wall 192 may be integrally formed with the single metallic body (i.e. a C-shaped side wall is formed in the cut-out section 174 between the top and bottom covers 112/114 of the metallic frame). In this example, by properly designing the metallic chassis (e.g. the cut-out section 174 with the side wall 192), the antenna 120 can be completely isolated from the platform RF noise sources located inside the chassis.

Figure 8A:
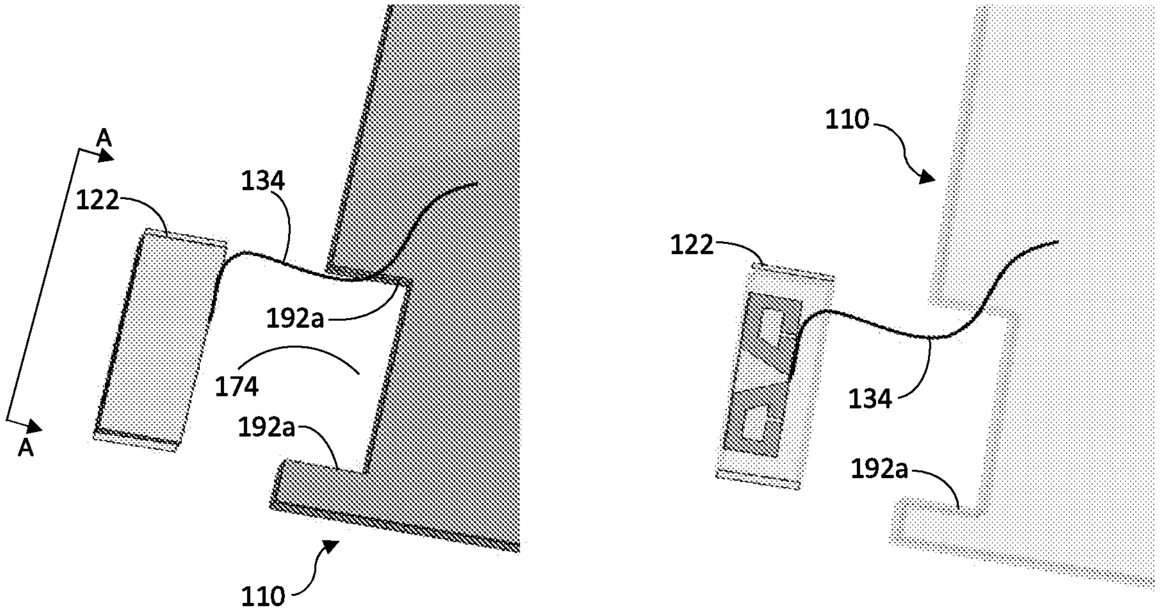
FIG. 8A shows connection of the antenna module to the inside of the frame using an antenna cable.

FIG. 8A shows connection of the antenna module to the inside of the frame using an antenna cable. An antenna cable feed-through hole (similar to the one shown in FIG. 4) may be formed in the side wall 192 and the antenna cable 134 (e.g. a coaxial cable) may be connected through the hole formed in the sidewall 192 of the chassis.

Figure 8B:
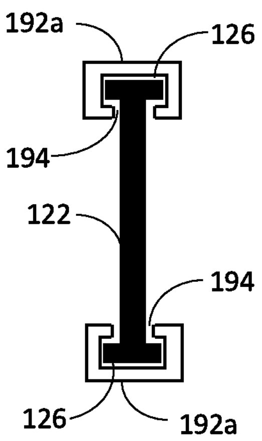
FIGS. 8B and 8C show a side view of example antenna module and the side wall or antenna shielding.
Figure 8C:
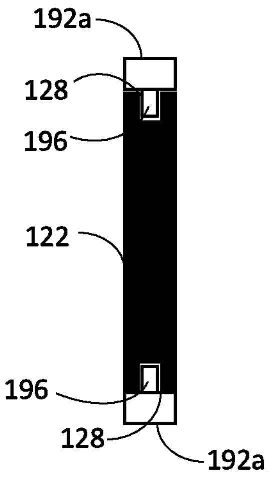

FIGS. 8B and 8C show a side view (A-A direction) of example connection mechanisms of the antenna module 122 to the frame 100. The connection mechanism may be formed both on the antenna module 122 and on the frame 100 (e.g. on the side wall or antenna shielding). With this scheme the antenna module 122 may be easily replaced. The antenna may be modularized such that the antenna module 122 may be upgraded or replaced easily.

In one example, as shown in FIG. 8B, the side walls 192*a* that are perpendicular to the outer edge of the frame 110 may have a channel 194 (a closed C-shaped channel) or a groove and each of the two opposing side edges of the antenna module 122 may have a matching tongue 126 so that the antenna module 122 may be installed to the frame 110 by sliding the antenna module 122 into the cut-out section 174. Alternatively, the tongue/groove structure may be opposite. As shown in FIG. 8C, the side walls 192*a* that are perpendicular to the outer edge of the frame 110 may have a tongue 196 or a protrusion and each of the two opposing side edges of the antenna module 122 may have a matching groove 128 so that the antenna module 122 may be installed to the frame 110 by sliding the antenna module 122 into the cut-out section 174.

Figure 9:
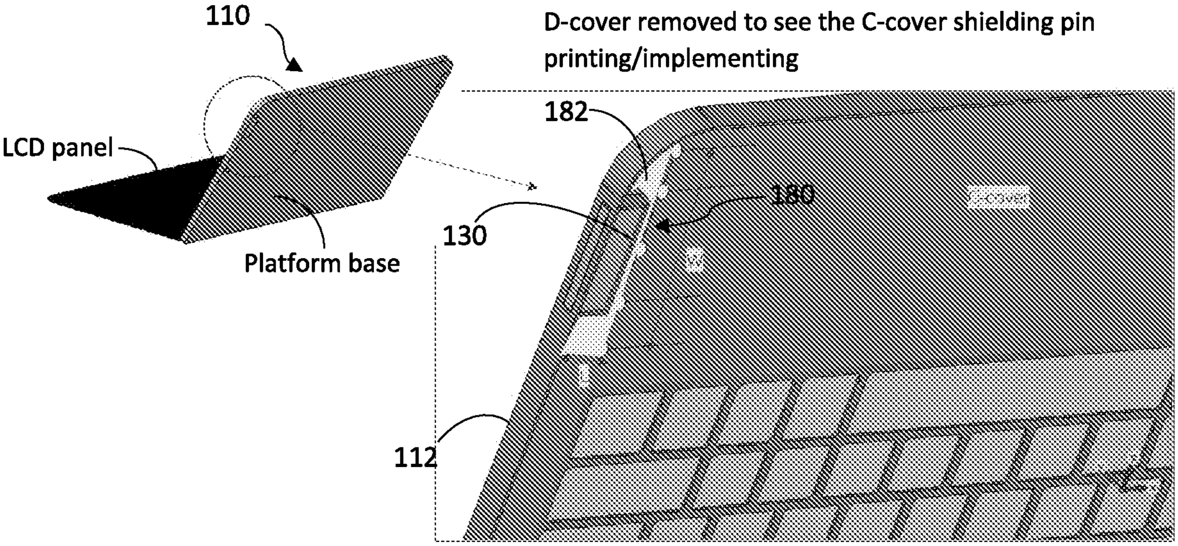
FIGS. 9 and 10 show an augmented antenna shielding in accordance with one example.
Figure 10:
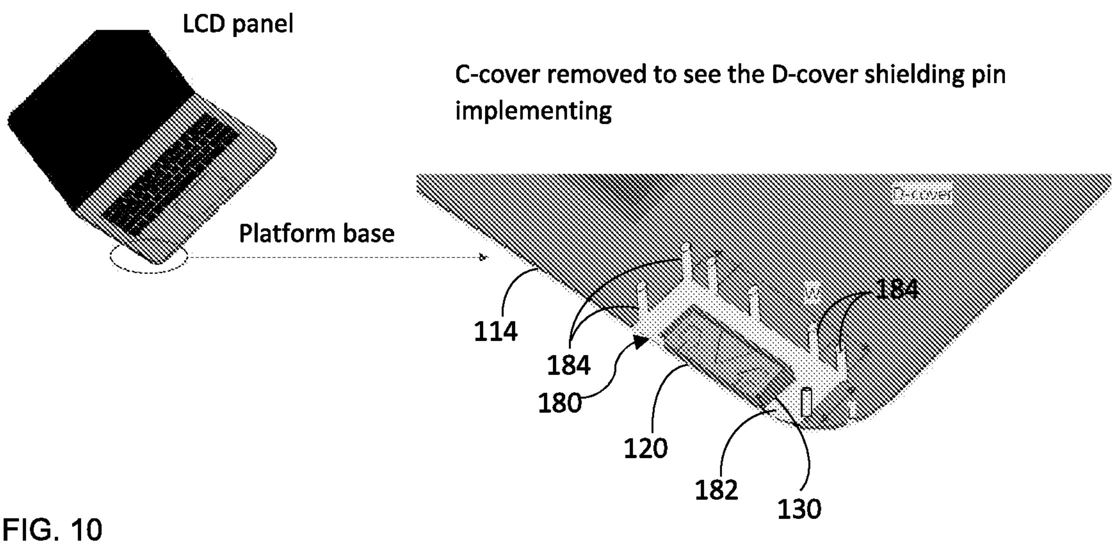

In another example, in order to enhance the shielding effectiveness for the antenna in a non-metallic chassis (e.g. a plastic chassis with metallic coating), an augmented antenna shielding 180 may be formed in addition to the antenna shielding 130 as shown in FIGS. 9 and 10. For example, the augmented antenna shielding 180 may include a metallic layer 182 and a vertical shielding fence 184. The metallic layer 182 may be an improved metal layer coating or a metal patch. The metallic layer 182 may be formed on the top cover 112 and the bottom cover 114, respectively, just outside of the antenna shielding 130, i.e. the metallic layer 182 is also in a C or U shape similar to the shape of the antenna shielding 130. The vertical shielding fence 184 may be formed along the outer perimeter of the metal layer 182 inside the frame 110 excluding the edge of the frame 110 that the antenna shielding 130 does not cover. In one example, the vertical shielding fence 184 may be a plurality metallic pins or contacts 186 formed between a metallic layer on the top cover 112 and a metallic layer on the bottom cover 114 and arranged in certain intervals as shown in FIG. 10. Alternatively, the vertical shielding fence 184 may be a solid wall formed between a metallic layer on the top cover 112 and a metallic layer on the bottom cover 114. The size of the metallic layer 182 (L×W) may be slightly larger (e.g., 5 mm) than the antenna shielding 130. The shielding effectives can be improved using the metallic layer 182 and the vertical metallic shielding fence 184.

A cost of a metallic unibody chassis can be prohibitively high for some product segments. Therefore, a plastic chassis with metallic coating may be the choice because it has a price advantage. However, a plastic chassis typically has metallic coating quality issues (e.g. discontinuity and non-uniformity of the metallic coating) and a chassis assembly gap between the top cover 112 and the bottom cover 114 is most likely present. The augmented antenna shielding 180 in accordance with the example above can provide effective shielding for the antenna in a plastic chassis, which allows the use of a plastic chassis for low cost high-volume PC manufacturing.

In order to integrate a full metallic shield around an antenna 120, the use of a conventional Wi-Fi antenna (a monopole antenna) should be avoided. The conventional monopole Wi-Fi antenna requires antenna ground connections to a chassis ground and this makes it hard to electrically isolate one from the other. In addition, the conventional monopole Wi-Fi antenna efficiency is extremely sensitive to the size of the antenna ground and a metallic object in proximity. Normally, any metallic object placed close to an antenna causes an unacceptable Wi-Fi antenna efficiency degradation.

Figure 11A:
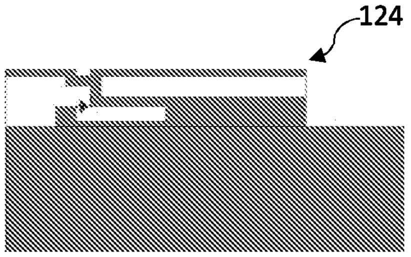
FIG. 11A shows an example monopole antenna.
Figure 11B:
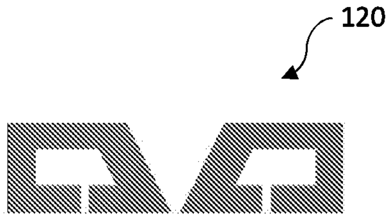
FIG. 11B shows an example dipole antenna.

In one example, a dipole antenna (or any antenna that does not require an RF ground) may be used to overcome the above issues. FIG. 11A shows an example monopole antenna 124, and FIG. 11B shows an example dipole antenna 120. It should be noted that the dipole antenna shown in FIG. 11B is provided merely as an example, not as a limitation, and any other type or configuration of diploe antenna or in general any antenna that does not require an RF ground may be used. The conventional monopole antenna requires its ground connection to the chassis ground plane. In FIG. 11A, the antenna ground is connected to the chassis ground plane, which is not good for antenna isolation. On the other hand, the dipole antenna shown in FIG. 11B can be electrically separated from the chassis ground and platform RF noise aggressors, and the antenna ground is isolated from the chassis ground plane, which is good for antenna isolation. The conventional monopole antenna is undesired for antenna isolation. The dipole antenna such as the one shown in FIG. 11B allows high electrical isolations from the chassis ground and platform RF noise aggressors.

Figures 12A, 12B:
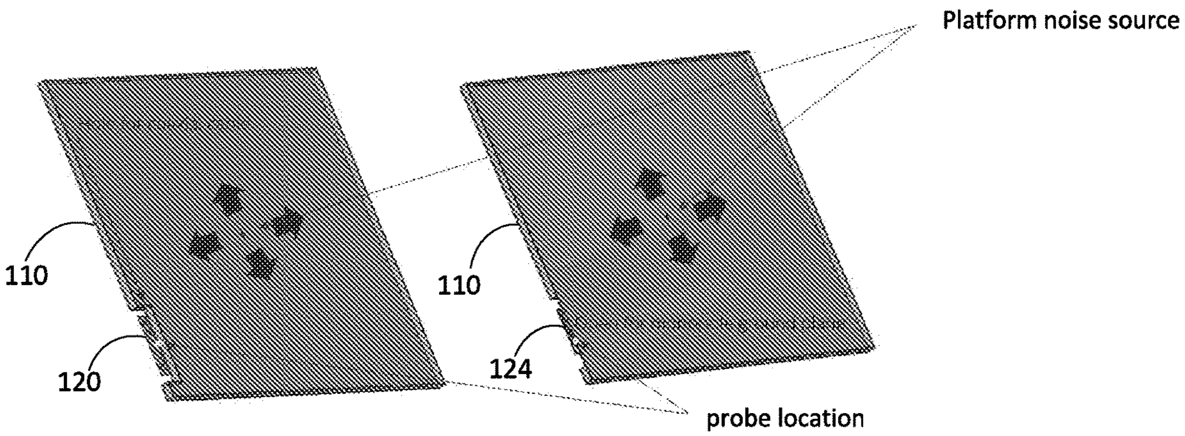
FIG. 12A shows an integration of a dipole antenna in a frame.
FIG. 12B shows an integration of a conventional monopole antenna in a frame.

FIG. 12A shows an integration of a dipole antenna 120 (the antenna shown in FIG. 11B) in a frame 110 and FIG. 12B shows an integration of a conventional monopole antenna 124 in a frame 110. Those two Wi-Fi antennas are integrated into the same chassis to compare the shielding effectiveness. FIGS. 12A and 12B also show simulated platform-generated RF noises (indicated by arrows) inside the frame 110.

Figure 13A:
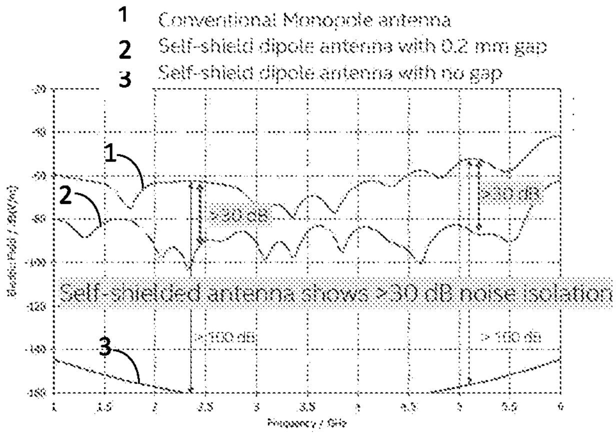
FIG. 13A shows a simulation results for platform RF noise comparison between the conventional monopole antenna and the dipole antenna when both antennas are integrated into a chassis as shown in FIGS. 12A and 12B.

FIG. 13A shows simulation results for platform RF noise comparison between the conventional monopole antenna and the dipole antenna when both antennas are integrated into a chassis as shown in FIGS. 12A and 12B. In FIG. 13, the electrical coupling levels (in dB) is measured between the Wi-Fi antennas and the platform RF noise source. The lower the values of the electric field intensity (representing higher noise isolation) at each frequency, the better the shielding effectiveness. The simulation results in FIG. 13A show that the shielded dipole antenna in accordance with the examples disclosed herein has about 30 dB better noise isolations than the conventional Wi-Fi integration case for both 2.4 GHz and 5 GHz bands.

Figure 13B:
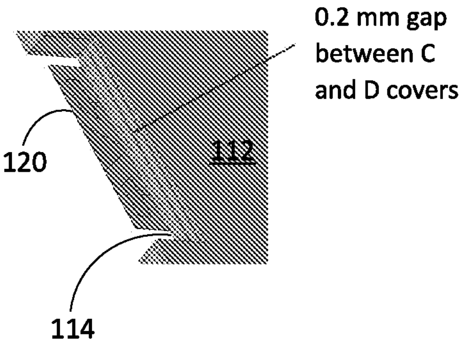
FIG. 13B shows a gap between the top cover and the bottom cover when assembled.

The about 30 dB improvement is achievable even with the consideration of a 0.2 mm mechanical chassis gap between the top cover 112 and the bottom cover 114, which is a realistic case. FIG. 13B shows the 0.2 mm gap between the top cover 112 and the bottom cover 114 when assembled. When the chassis is properly designed to have no openings or gaps between the top cover 112 and the bottom cover 114, the platform noise isolation in accordance with the examples disclosed herein can be substantially improved as depicted by line 3 in FIG. 13A.

Figure 14:
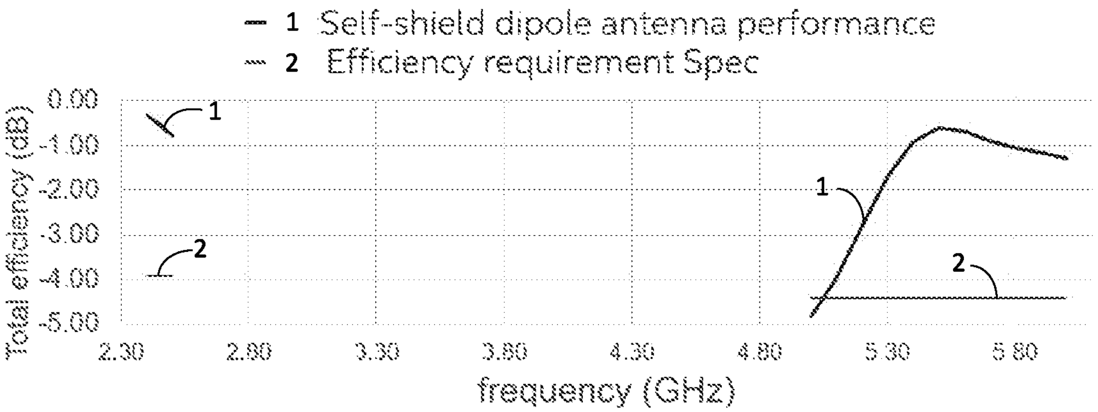
FIG. 14 shows simulation results for the self-shielded dipole antenna performance in the metal chassis case.

FIG. 14 shows a simulation results for the self-shielded dipole antenna performance in the metal chassis case. In this simulation, the antenna efficiency is measured by taking the ratio of the applied energy to the antenna to the radiated energy from the antenna and may be expressed as, percentage or dB values. Ratio may indicate that the maximum achievable antenna efficiency is 1 or 100% or 0 dB. Higher efficiency may indicate more energy radiation into the air and it is desired. In practical and acceptable WiFi performance in 2.4 GHz and 5.0 GHz frequency bands, −4 dB antenna efficiency may be widely accepted through industry for notebook, tablet and cellular phone platforms. FIG. 14 shows that the efficiency of the self-shield dipole antenna in accordance with the examples disclosed herein passes the Wi-Fi efficiency requirements for both 2.4 GHz and 5 GHz bands except the first channel of 5 GHz band. However, this ~0.5 dB violation for one Wi-Fi channel may not be a concern. It can be easily overcome by additional dipole antenna optimizations or by increasing metallic keep out distance from 5 mm. The cable loss is not included in the simulation in FIG. 14.

Figure 15A:
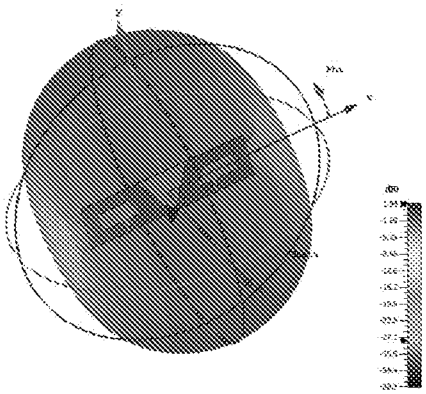
FIGS. 15A, 15B, 16A, and 16B show radiation patterns of a standalone dipole antenna and the diploe antenna integrated in an electronic computing device including the antenna shielding.
Figure 15B:
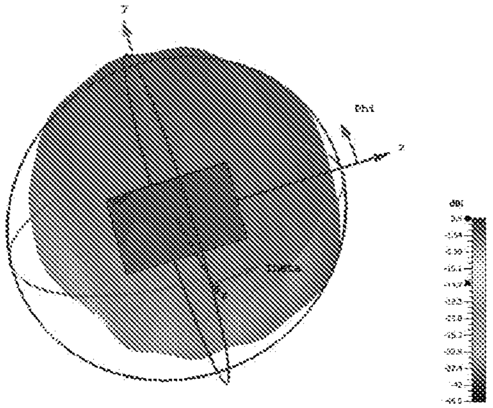
Figure 16A:
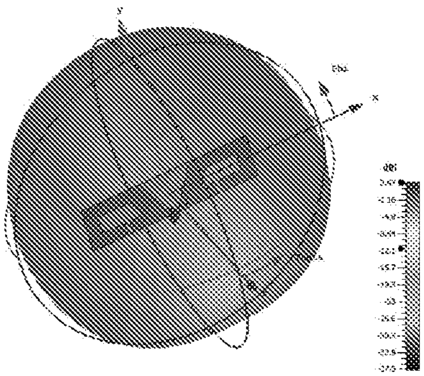
Figure 16B:
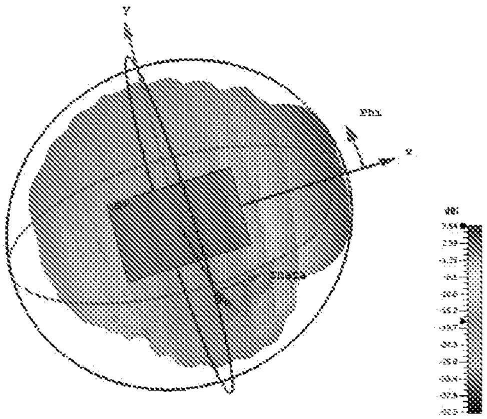

FIGS. 15A/B and FIGS. 16A/B show radiation patterns of a standalone dipole antenna (the antenna 120 shown in FIG. 11B) and the diploe antenna 120 integrated in an electronic computing device including the antenna shielding 130 in accordance with the examples disclosed herein. FIGS. 15A and 15B show far-field radiation patterns at 2.4 GHz of a standalone dipole antenna (the antennas shown in FIG. 11B) and an integrated dipole antenna (as shown in FIG. 12A), respectively. FIGS. 16A and 16B show far-field radiation patterns at 5 GHz of a standalone dipole antenna (the antennas shown in FIG. 11B) and an integrated dipole antenna (as shown in FIG. 12A), respectively. FIGS. 15A/B and FIGS. 16A/B show that the three-dimensional far-field radiation patterns of the dipole antenna are all omni-directional without any nulls.

Figure 17:
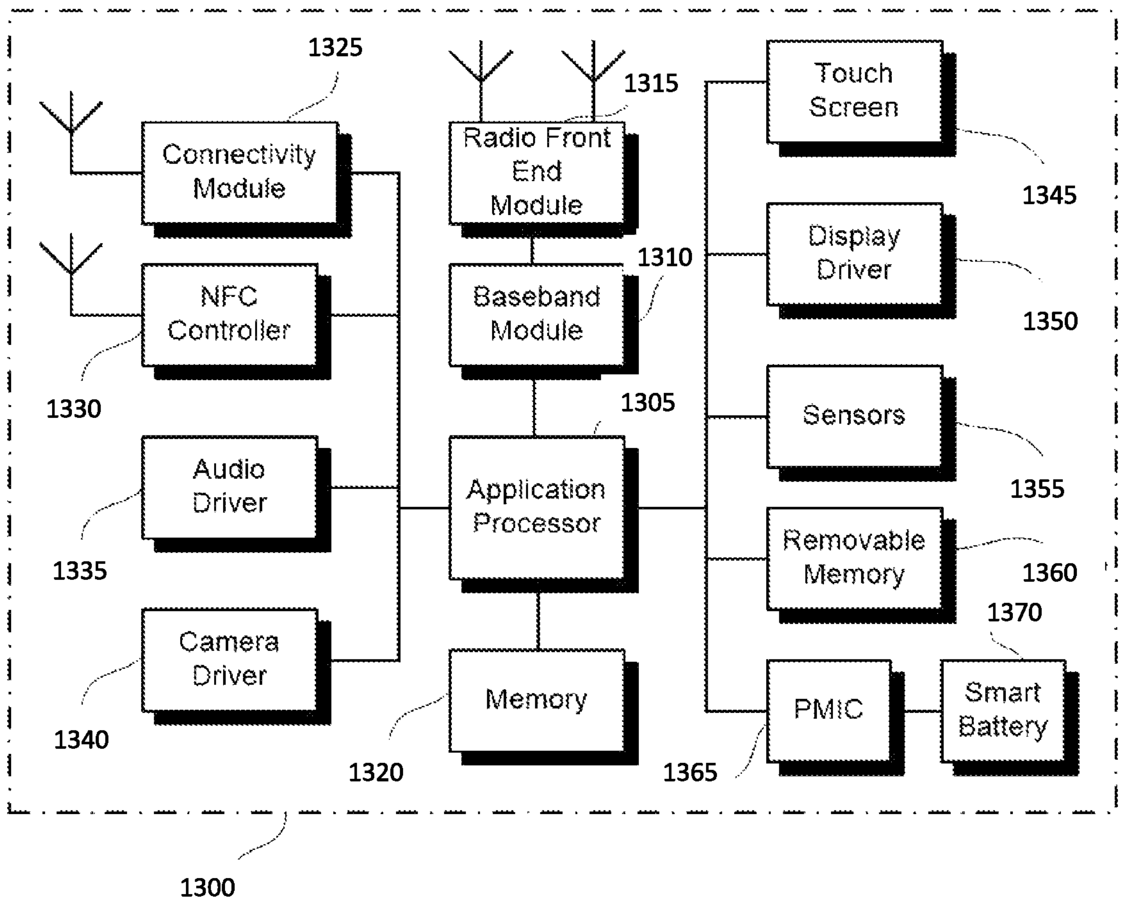
FIG. 17 illustrates a user device in which the examples disclosed herein may be implemented.

FIG. 17 illustrates a user device 1300 in which the examples disclosed herein may be implemented. The electronic computing device as disclosed in the examples above may be the user device 1300. The user device 1300 may be a mobile device in some aspects and includes an application processor 1305, baseband processor 1310 (also referred to as a baseband module), radio front end module (RFEM) 1315, memory 1320, connectivity module 1325, near field communication (NFC) controller 1330, audio driver 1335, camera driver 1340, touch screen 1345, display driver 1350, sensors 1355, removable memory 1360, power management integrated circuit (PMIC) 1365 and smart battery 1370.

In some aspects, application processor 1305 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (TO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1310 may be implemented, for example, as a solder-down substrate including one or more integrated circuits, a single packaged integrated circuit soldered to a main circuit board, and/or a multi-chip module containing two or more integrated circuits.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is an electronic device. The electronic device includes a frame including a top cover and a bottom cover, wherein electronic components are included in a space formed between the top cover and the bottom cover, an antenna for wireless transmission and reception, wherein the antenna is included in the frame near an edge of the frame, and an antenna shielding disposed around the antenna for providing electro-magnetic shielding from the electronic components included in the frame.

Examine 2 is the electronic device of example 1, wherein the antenna shielding is a metal wall disposed between the top cover and the bottom cover around the antenna.

Example 3 is the electronic device of example 2, wherein the metal wall includes an antenna cable feed-through hole.

Example 4 is the electronic device of example 3, wherein an antenna cable is connected to the antenna via a conductive grommet that is inserted into the antenna cable feed-through hole.

Example 5 is the electronic device of example 3, wherein the antenna is connected to a circuitry inside the frame via a pogo pin.

Example 6 is the electronic device as in any one of examples 1-5, wherein the frame includes a non-metallic area on the top cover and/or the bottom cover above and below the antenna.

Example 7 is the electronic device as in any one of examples 1-5, wherein the frame is a metallic frame.

Example 8 is the electronic device of example 7, wherein the frame includes a cut-out in the top cover and the bottom cover above and below the antenna, and a non-metallic cover is provided in the cut-out.

Example 9 is the electronic device of example 8, where the antenna shielding and the frame are formed integrally.

Example 10 is the electronic device as in any one of examples 1-5, wherein the frame is a non-metallic frame with a metallic coating.

Example 11 is the electronic device of example 10, further comprising an augmented antenna shielding.

Example 12 is the electronic device of example 11, wherein the augmented antenna shielding comprises a metallic layer on the top cover and the bottom cover, respectively, outside the antenna shielding and a vertical shielding fence formed along an outer edge of the metallic layer.

Example 13 is the electronic device of example 12, wherein the vertical shielding fence comprises a plurality metallic pins or contacts formed between a metallic layer on the top cover and a metallic layer on the bottom cover.

Example 14 is the electronic device as in any one of examples 1-5, wherein the antenna is an antenna that does not require an RF ground.

Example 15 is the electronic device as in any one of examples 1-5, wherein the antenna is a dipole antenna.

Example 16 is the electronic device as in any one of examples 1-5, wherein the antenna is configured to operate on a 2.4 GHz band or a 5 GHz band.

Example 17 is the electronic device as in any one of examples 1-5, wherein the electronic device is one of a notebook computer, a table computer, a mobile phone, a smart phone, or a desk-top computer.

Example 18 is the electronic device as in any one of examples 1-5, wherein the antenna is a replaceable antenna module.

Example 19 is a method for manufacturing an electronic device. The method includes providing a frame including a top cover and a bottom cover, wherein electronic components are included in a space formed between the top cover and the bottom cover, installing an antenna for wireless transmission and reception in the frame near an edge of the frame, and forming an antenna shielding disposed around the antenna for providing electro-magnetic shielding from the electronic components included in the frame.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An electronic device comprising:

a frame including a top cover and a bottom cover, wherein electronic components are included in a space formed between the top cover and the bottom cover;

an antenna for wireless transmission and reception, wherein the antenna is included in the frame near an edge of the frame; and an antenna shielding disposed around the antenna for providing electro-magnetic shielding from the electronic components included in the frame, wherein the frame is a non-metallic frame with a metallic coating, wherein the electronic device further comprising an augmented antenna shielding, wherein the augmented antenna shielding comprises a metallic layer on the top cover and the bottom cover, respectively, outside the antenna shielding and a vertical shielding fence formed along an outer edge of the metallic layers on the top and bottom covers.

2. The electronic device of claim 1, wherein the antenna shielding is a metal wall disposed between the top cover and the bottom cover around the antenna.

3. The electronic device of claim 2, wherein the metal wall includes an antenna cable feed-through hole.

4. The electronic device of claim 3, wherein an antenna cable is connected to the antenna via a conductive grommet that is inserted into the antenna cable feed-through hole.

5. The electronic device of claim 3, wherein the antenna is connected to a circuitry inside the frame via a pogo pin.

6. The electronic device of claim 1, wherein the frame includes a non-metallic area on the top cover and/or the bottom cover above and below the antenna.

7. The electronic device of claim 1, wherein the frame is a metallic frame.

8. The electronic device of claim 7, wherein the frame includes a cut-out in the top cover and the bottom cover above and below the antenna, and a non-metallic cover is provided in the cut-out.

9. The electronic device of claim 8, where the antenna shielding and the frame are formed integrally.

10. The electronic device of claim 1, wherein the vertical shielding fence comprises a plurality metallic pins or contacts formed between a metallic layer on the top cover and a metallic layer on the bottom cover.

11. The electronic device of claim 1, wherein the antenna is an antenna that does not require a radio frequency (RF) ground.

12. The electronic device of claim 1, wherein the antenna is a dipole antenna.

13. The electronic device of claim 1, wherein the antenna is configured to operate on a 2.4 GHz band or a 5 GHz band.

14. The electronic device of claim 1, wherein the electronic device is one of a notebook computer, a table computer, a mobile phone, a smart phone, or a desk-top computer.

15. The electronic device of claim 1, wherein the antenna is a replaceable antenna module.

16. A method for manufacturing an electronic device comprising:

providing a frame including a top cover and a bottom cover, wherein electronic components are included in a space formed between the top cover and the bottom cover;

installing an antenna for wireless transmission and reception in the frame near an edge of the frame; and forming an antenna shielding disposed around the antenna for providing electro-magnetic shielding from the electronic components included in the frame, wherein the frame is a non-metallic frame with a metallic coating, wherein an augmented antenna shielding is further formed, wherein the augmented antenna shielding comprises a metallic layer on the top cover and the bottom cover, respectively, outside the antenna shielding and a vertical shielding fence formed along an outer edge of the metallic layers on the top and bottom covers.

* * * * *